United States Patent
Schmidt et al.

(10) Patent No.: US 6,537,436 B2
(45) Date of Patent: Mar. 25, 2003

(54) SYSTEM FOR ELECTRODIALYSIS TREATMENT OF LIQUIDS

(76) Inventors: Ernst Schmidt, 5220 Arbor Way, Las Vegas, NV (US) 89107; Michael E. Williams, Rt. 5, Box 756, Albany, KY (US) 42605; Brian M. Schmidt, 5209 Clouds Rest Ave., Las Vegas, NV (US) 89108; James Schmidt, 9505 Cliff View Way, Las Vegas, NV (US) 89117; Erich Schmidt, 7115 Newland St., Arvada, CO (US) 80003

( * ) Notice: Subject to any disclaimer, the term of this patent is extended or adjusted under 35 U.S.C. 154(b) by 0 days.

(21) Appl. No.: 09/871,138

(22) Filed: May 31, 2001

(65) Prior Publication Data

US 2001/0037942 A1 Nov. 8, 2001

Related U.S. Application Data

(62) Division of application No. 09/561,049, filed on Apr. 28, 2000, now Pat. No. 6,274,020.

(51) Int. Cl.[7] .............................. C02F 1/40; C02F 1/469
(52) U.S. Cl. ...................... 204/542; 204/530; 204/542; 204/635; 204/522; 204/523
(58) Field of Search ................................ 204/523, 542, 204/530, 627, 633, 635, 518, 520, 522, 541

(56) References Cited

U.S. PATENT DOCUMENTS

| | | | |
|---|---|---|---|
| 3,223,612 A | 12/1965 | Chen et al. | 204/301 |
| 3,235,481 A | 2/1966 | Zwart, Jr. | 204/301 |
| 3,291,716 A * | 12/1966 | Cioffi | 204/635 |
| 3,405,047 A | 10/1968 | Chen | 204/180 |
| 3,412,006 A * | 11/1968 | Alexander et al. | 204/296 |
| 3,761,386 A * | 9/1973 | Smith | 204/635 |
| 3,878,086 A * | 4/1975 | Haswell et al. | 204/635 |
| 4,319,978 A * | 3/1982 | Millman | 204/635 |
| 4,676,908 A * | 6/1987 | Ciepiela et al. | 204/524 |
| 5,948,230 A | 9/1999 | McRae | 204/524 |
| 5,972,191 A | 10/1999 | Mani | 204/631 |
| 6,274,020 B1 | 8/2001 | Schmidt et al. | 204/636 |

FOREIGN PATENT DOCUMENTS

JP  60068009 A2  4/1985

* cited by examiner

Primary Examiner—Nam Nguyen
Assistant Examiner—Thomas H. Parsons
(74) Attorney, Agent, or Firm—Pitts & Brittian P.C.

(57) ABSTRACT

An electrodialysis treatment system utilizing a plurality of disparate layers of an electrodialysis cell stack for separation of components in liquid mixtures. The system for electrodialysis treatment for purification and deionizing liquids includes providing an operation of pretreatment by filtration for removal of inorganic and organic contaminants and generating a filtrate effluent. An adsorbing operation for adsorbing organic contaminants from the filtrate effluent of the pretreatment operation is provided by utilizing activated carbon adsorption and generating a liquid fraction. A deionizing operation for continuously purifying the liquid fraction is provided by utilizing an electrodialysis stack having a plurality of ion exchange membranes and separating gaskets for selectively removing contaminant ions from the liquid fraction of the adsorbing operation. The deionizing operation provides continuous purifying and deionizing of the liquid fraction to generate ultra-pure water or other purified liquid mixtures.

8 Claims, 6 Drawing Sheets

SYSTEM FOR ELECTRODIALYSIS TREATMENT OF LIQUIDS

CROSS-REFERENCE TO RELATED APPLICATIONS

This patent application is a division of U.S. patent application Ser. No. 09/561,049, filed Apr. 28, 2000, now U.S. Pat. No. 6,274,020.

BACKGROUND OF INVENTION

1. Field of Invention

The invention relates to an apparatus and a system of operation of a plurality of ion-exchange membranes. More specifically, the invention relates to an apparatus and system of operation of a plurality of electrodialysis membranes and gaskets stacked for separation of components from liquids passing through the membranes.

2. Description of the Related Art

Prior methods of treatment for separating polar components in liquid mixtures having contaminants have been utilized to purify water, to desalinate water, and to purify ethylene glycol or other mixtures of chemicals. One method utilizes ion exchange resins for separation of polar components on granular ion exchange resins, which require chemical regeneration of the resins and/or disposal of the resins. Another treatment method for separating polar components in liquid mixtures include micro-porous membranes which selectively allow smaller polar compounds to pass through the membrane, while denying passage of larger sized polar compounds. Another treatment method includes ion exchange membranes having anion and cation exchange membranes assembled in an alternating configuration in a unit of membranes.

Prior purifying and recycling devices include a plurality of ion exchange bipolar membranes separating solution compartments, and gasket separators secured together in face-to-face contact in a configuration of a multi-layered, stacked plate. The gasket separators between the membranes provide sealing at the edges of the stacked plate of membranes, and enable a fluid to flow into and out of the stacked plate and through the individual solution compartments between the stacked plate of membranes. The ion exchange bipolar membranes can contain an anode and a cathode electrode at the respective ends of the stack of membranes in order to provide an electrical input for maintaining a differential voltage between the anode end and the cathode end. When a direct current is passed through the multi-layered stacked plate, the ions contained in the solution to be purified will migrate in a direction in relation to the current depending on the charge of each ion in the solution. The cations move toward the cathode or negative electrode, while the anions move toward the anode or positive electrode. By controlling the electrical input, and therefore the differential voltages, an operator induces the movement of the cations and anions in different directions across the stack of membranes, thereby operating the purifying and recycling system to remove contaminants from ethylene glycol, water, and/or other liquid solutions.

At least three types and sizes of stacks of electrodialysis membrane units are utilized in prior purifying and recycling devices, including an electrodialysis concentration cell having a cation membrane, a dilution or feed compartment, an anion membrane, and a concentrate or product compartment which forms a unit utilized for desalinating of brine solutions. A second type of electrodialysis membrane unit includes a two-compartment cation cell having a bipolar membrane, a feed compartment, a cation membrane, and a base or product compartment. A third type of electrodialysis membrane unit includes a two-compartment anion cell having a bipolar membrane, a product compartment, an anion membrane, and a feed compartment. Additional types of electrodialysis membranes can include any combination of layers of the above three types to form a plurality of cation and anion membranes, interspersed with compartments and gaskets separating the compartments. Electrodialysis designs for flow through the stacks of electrodialysis membranes include sheet flow and tortuous flow. Sheet flow stacks induce liquid flow across the length or width of the active membrane surface area, and generally are utilized for low linear velocity conditions in the range of 5 to 10 cm/sec. Tortuous flow stacks induce liquids to take a long flow path around gaskets, and are utilized for higher linear flow velocity conditions in the range of 30 to 50 cm/sec.

Utilization of the electrodialysis designs as described above in stacks of membranes for purifying and recycling of ethylene glycol solutions, or for purifying water and desalinating water require a plurality of multiple membranes having complicated configurations. There is a need for a simplified design of a series of electrodialysis membranes in stacked configurations for improved removal efficiencies of contaminants in a purification and deionizing system.

Therefore, it is an object of the present invention to provide an improved membrane cell stack for purification of liquid mixtures.

It is another object of the present invention to provide a method of operation for an electrodialysis treatment system providing increased efficiency for ion-removal of liquid mixtures.

It is another object of the present invention to provide a membrane and gasket cell stack system having reduced assembly time.

It is another object of the present invention to provide a system having a plurality of membranes and interchangeable gaskets for improved efficiency for removal of contaminants by electrodialysis deionizing of liquid mixtures.

It is another object of the present invention to provide an improved system having a plurality of membranes and interchangeable gaskets for improved efficiency for deionizing liquid mixtures by an electrodialysis apparatus.

BRIEF SUMMARY OF INVENTION

An apparatus and system of operation is disclosed for the separation of polar components, inorganic contaminants, and organic contaminants within liquid mixtures. The apparatus and system of operation for purification and deionizing liquid mixtures includes an operation of pretreatment by utilizing filtration for removal of inorganic contaminants and organic contaminants utilizing oil/water separation methods and settling methods for removal of suspended solids. The system of operation includes an operation of adsorption treatment for the filtrate effluent of the pretreatment operation. The adsorption operation includes removing organic contaminants by utilizing activated carbon adsorption methods.

The system of operation further includes an operation of deionizing for treating of the effluent liquids from the adsorption operation. The deionizing operation includes a system utilizing an apparatus having an electrodialysis cell stack including a plurality of disparate layers being stacked together, the electrodialysis cell stack having a first end and a second end, with the plurality of disparate layers stacked contiguous between the first end and second end. A support frame supports the cell stack and encloses a perimeter of the plurality of disparate layers, with the layers being disposed in a repetitive sequence of layers between the first outer end and second outer end of the support frame. The plurality of disparate layers of materials are disposed contiguous, having a first outer layer at the first end, and a second outer layer at the second end, with the plurality of disparate layers interdisposed therebetween. The plurality of disparate layers include at least two electrodialysis gaskets, the first of the electrodialysis gaskets being positioned as the first outer layer at the first end, opposite the second of the electrodialysis gaskets being positioned as the second outer layer at the second end.

A cathode electrode plate is positioned proximate to the first end and interior of the first electrodialysis gasket. An anode electrode plate is positioned proximate to the second end and interior of the second electrodialysis gasket at the second end. A voltage generating means is connected to the cell stack for application of an electrical voltage differential between the cathode electrode plate and the anode electrode plate.

The plurality of disparate layers are disposed between the cathode and anode electrode plates and include a series of layers of differing permeability, the layers selected from a group comprising a first electrodialysis membrane gasket, a first turbulence promoter, an anion membrane, a second electrodialysis membrane gasket, a second turbulence promoter, a cation membrane, a third electrodialysis membrane gasket, and a third turbulence promoter, whereby the plurality of disparate layers can be repeated in series as required. A connecting means provides connection of the plurality of disparate layers within the support frame, the connecting means including removably attachable connectors to allow the plurality of disparate layers to be replaced, and/or additional series of layers of differing permeability to be added to the electrodialysis cell stack.

The electrodialysis cell stack can further include the series of layers being repeated as required for removal of polar components and/or additional contaminants, with additional turbulence promoters being added to increase the dispersion of the liquid mixtures therethrough to increase the efficiency of removal of contaminants upon application of electrical voltage differential between the cathode electrode plate and the anode electrode plate.

The electrodialysis cell stack of disparate layers and enclosing frame of the deionizing operation provides continuous purifying of ethylene glycol and glycol/water mixtures, provides for continuous desalinating of water, and/or provides for continuous deionizing of water to generate ultra-pure water or other purified liquid mixtures.

The deionizing operation can be followed by an evaporation system for removal of excess water from the purified ethylene glycol or other liquid mixtures, with the purified liquids and/or deionized liquids being available for recycle and reuse. The combination of treatment operations and the deionizing operation provides a continuous operating system with minimized down-time and improved efficiencies over prior methods for purification and deionizing liquid mixtures.

BRIEF DESCRIPTION OF SEVERAL VIEWS OF DRAWINGS

The above-mentioned objects and advantages of the present invention are readily apparent from the description of the invention contained herein, and by reference to the claims, read together with the drawings in which:

DETAILED DESCRIPTION OF THE INVENTION

Figure 1:
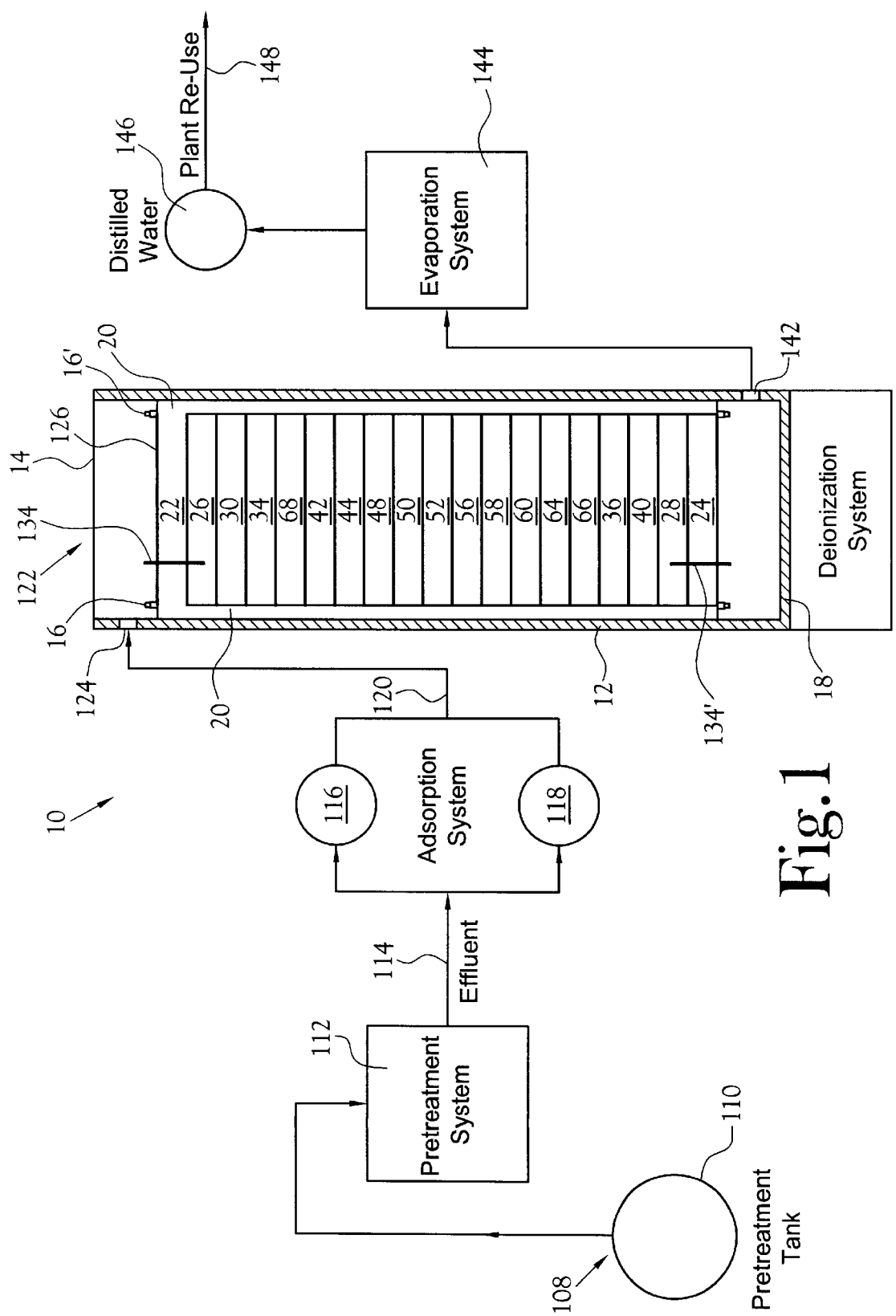
FIG. 1 is a flow diagram illustrating the operations of the present invention for purification and deionizing liquid mixtures utilizing an electrodialysis operation.

In accordance with the present invention, there is disclosed an apparatus and system of operation for the separation of polar components, inorganic contaminants, and organic contaminants within liquid mixtures for purification and deionizing liquid mixtures. FIG. 1 illustrates the plurality of operations 10 for adequate operation of one embodiment of the deionizing system 122 of the present invention of the apparatus and system of operation, including an operation of pretreatment for a volume of contaminated liquids 108 by utilizing filtration for removal of inorganic contaminants and organic contaminants removal utilizing oil/water separation of suspended solids in a plurality of storage tanks 110. The pretreatment operation 112 utilizes an oil/water separator 112 and storage containers known to those skilled in the art.

The system of operation includes an operation of adsorption 116, 118 for treating of the effluent liquids from the pretreatment operation. The adsorption operation includes removing organic contaminants by utilizing activated carbon adsorption compounds known to those skilled in the art.

Figure 6:
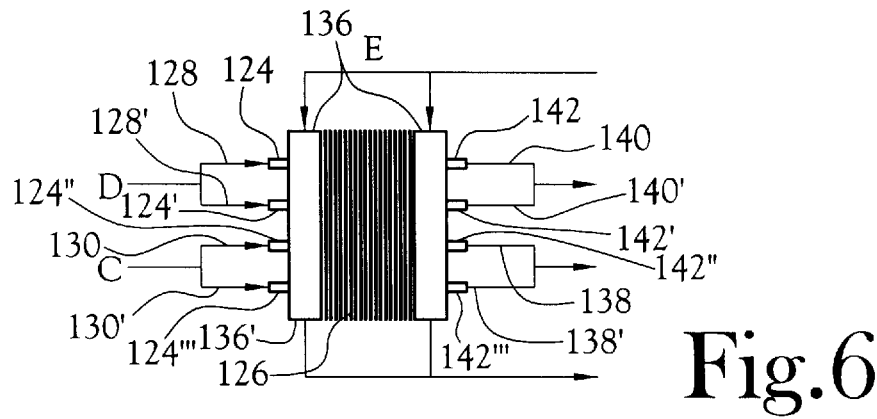
FIG. 6 is a top view of an assembled plurality of disparate layers of the electrodialysis cell stack of FIG. 2.
Figure 7:
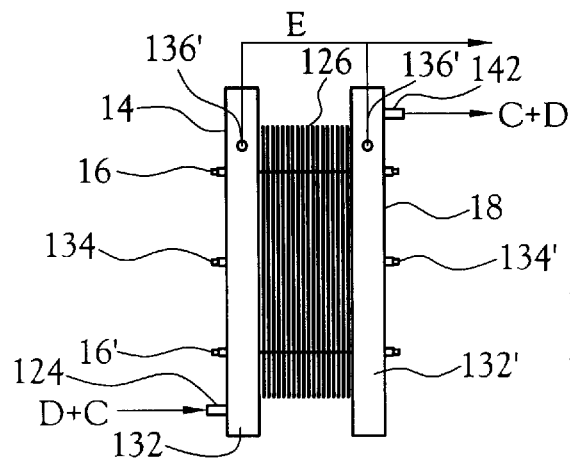
FIG. 7 is a side view of the assembled electrodialysis cell stack of FIG. 6.
Figures 8, 9:
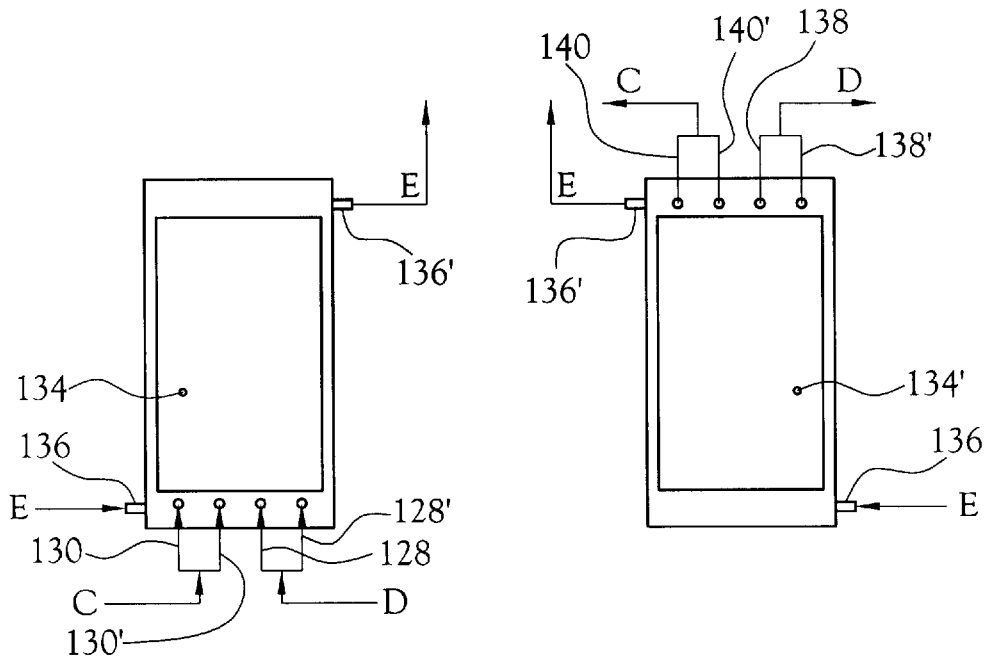
FIG. 8 is a front view of the assembled electrodialysis cell stack of FIG. 7.
FIG. 9 is a rear view of the assembled electrodialysis cell stack of FIG. 8.

The system of operation further includes an operation of deionizing 122 for treating of the effluent liquids from the adsorption operation. The deionizing operation includes an apparatus including an electrodialysis membrane cell stack 12 having a plurality of ion exchange membranes and separating gaskets for selectively removing contaminant ions from the effluent liquids. The membrane cell stack 12 includes a first end 14, a central stack of a plurality of disparate layers being stacked on top of each layer (see FIG. 1), or being stacked side-by-side (see FIG. 6), and a second end 18 opposed from the first end 14 and enclosing the plurality of disparate layers.

A support frame 20 utilizing connecting members such as a pair of connector bolts 16, 16' through the perimeter of the central stack provides a partially enclosing frame for the plurality of disparate layers that are disposed contiguous within the support frame 20. The support frame 20 includes a first end proximate the first end 14 of the central stack, and a second end proximate the second end 18 of the central stack.

Figure 2:
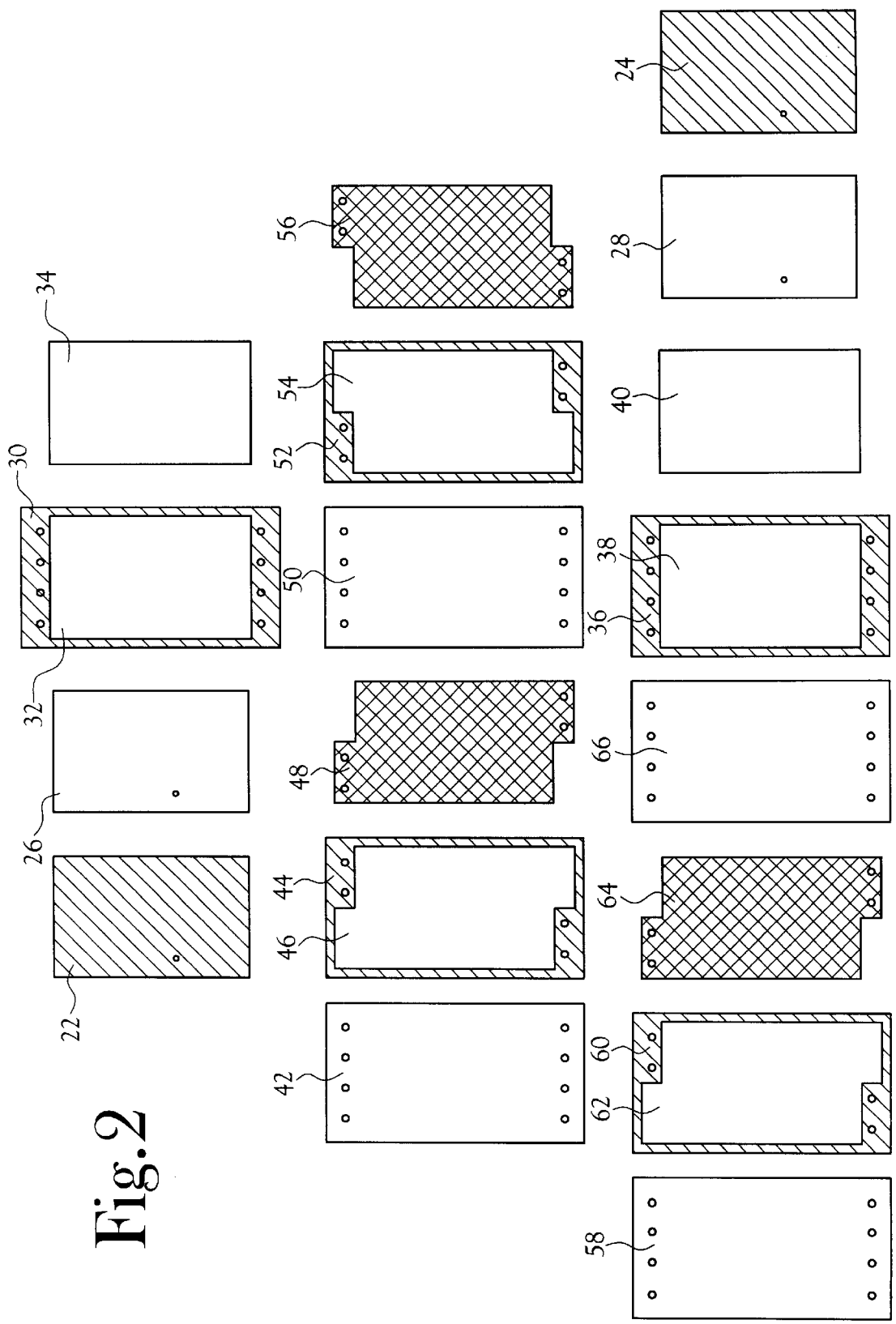
FIG. 2 is a process schematic of one embodiment of a plurality of disparate layers of an electrodialysis cell stack of ion exchange membranes of the deionizing operation of FIG. 1.
Figure 3:
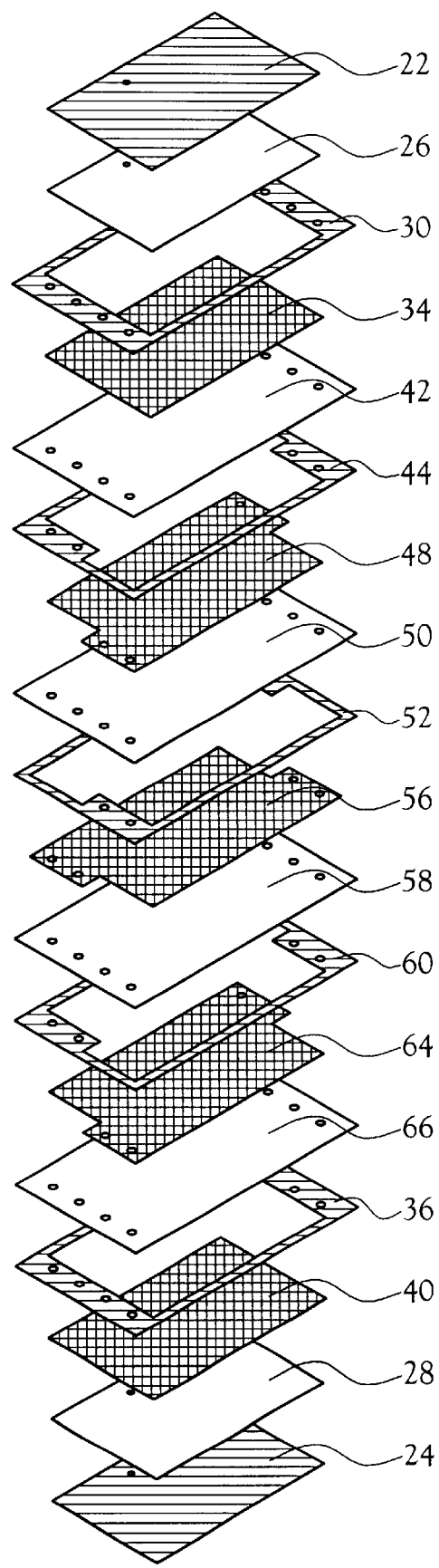
FIG. 3 is a perspective view of a plurality of disparate layers of the electrodialysis cell stack of FIG. 2.
Figure 4:
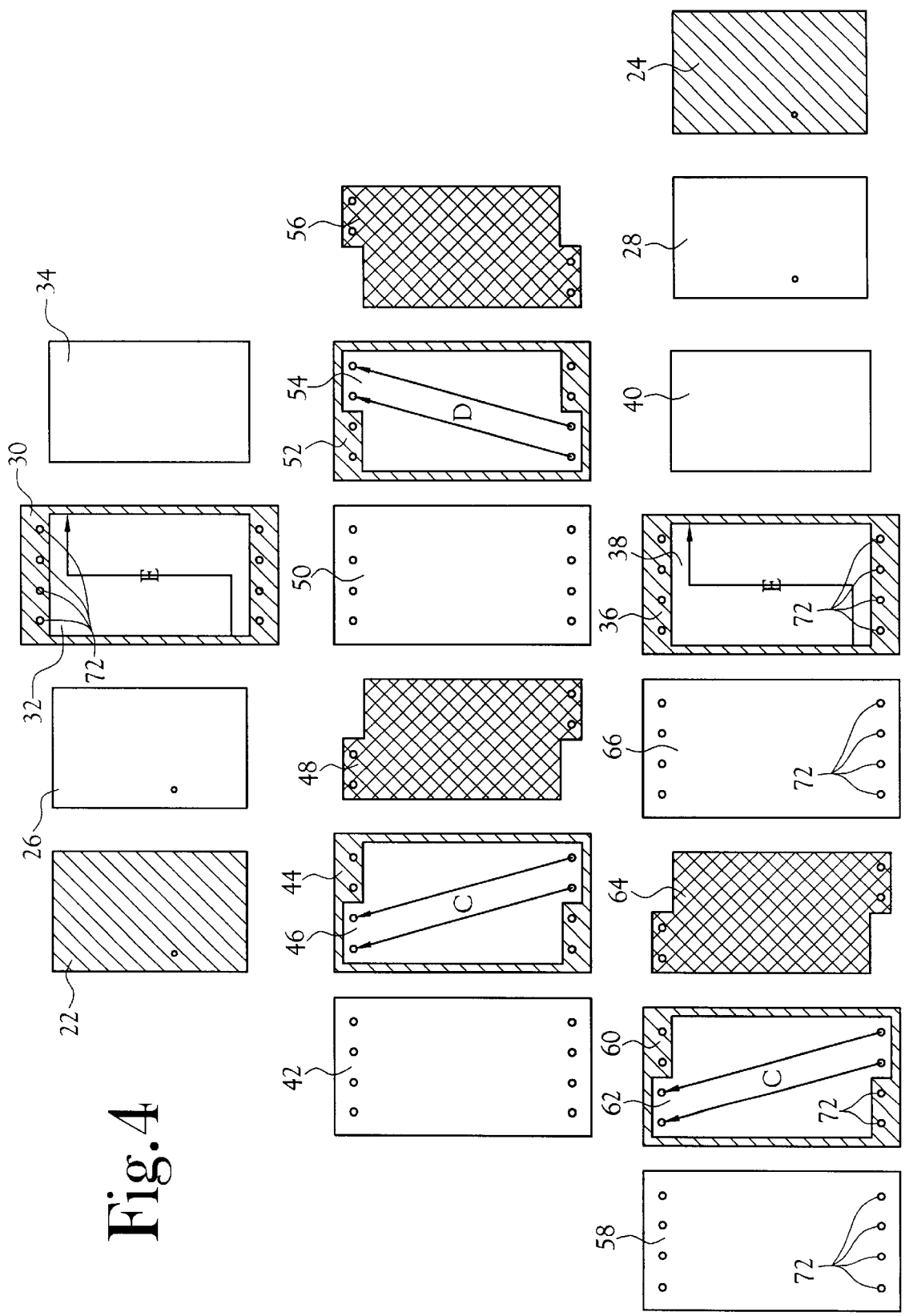
FIG. 4 is a process schematic of FIG. 2 of a plurality of disparate layers illustrating the flow of liquid mixtures through and across the disparate layers.

The plurality of disparate layers of materials are disposed contiguous, having a first outer layer at the first end 14, and a second outer layer at the second end 18, with the plurality of disparate layers interdisposed therebetween (see FIGS. 2 and 3). The plurality of disparate layers include at least two electrodialysis gaskets composed of ethylene propylene diene monomer (EPDM), the first EPDM gasket 22 being positioned as the first outer layer proximate the first end 14, with a second EPDM gasket 24 being positioned as the second outer layer proximate the second end 18.

The first electrodialysis EPDM gasket 22 and the second electrodialysis EPDM gasket 24 are each about 0.031 inches thick, and have the following dimensions. Each gasket 22, 24 includes an exterior width of about 1'5⅜", and an exterior length of about 2'3⅞", with a ¾" diameter off-center hole through an area about 2¹¹⁄₁₆" distance inward to the center of the off-center hole from a first side of the gaskets 22, 24, and the center of the off-center hole about 1'5⁷⁄₁₆" along the length from the top edge of the gaskets 22, 24.

A cathode electrode plate 26 is positioned proximate the first end 14 of the plurality of disparate layers. The cathode electrode plate 26 can be composed of a stainless steel plate and is positioned within the first electrodialysis gasket 22. An anode electrode plate 28 is positioned proximate the second end 18, can be composed of a titanium and platinum alloy, and is positioned inwardly within the second electrodialysis gasket 24. The cathode electrode plate 26 and the anode electrode plate 28 are about 0.030 inches thick, and have the following dimensions. The plates 26, 28 have an exterior width of about 1'5⅜", and an exterior length of about 2'3⅞", with an off-center 3/8" threaded rod through an area of about 2¹¹⁄₁₆" distance inward to the center of the off-center rod from a first side of the plates 26, 28, and the center of the off-center rod about 1'5⁷⁄₁₆"along the length from the top edge of the plates 26, 28. Connector rods 16, 16' of about four inches in length are utilized to connect the plates 26, 28 and a plurality of layers between together. A voltage generating means (not shown) is connectable to the cathode electrode plate 26 and separately to the anode electrode plate 28 of the membrane cell stack 12 for application of an electrical voltage differential between the cathode electrode plate 26 and the anode electrode plate 28. The voltage generating means can include a voltage generator and an electrode 134 inserted to contact the cathode electrode plate 26, and a separate electrode 134' inserted to contact the anode electrode plate 28. The application of an electrical voltage differential provides for improved removal of polar contaminants from concentrated liquids directed across the cation membranes 50, 66 (discussed below) that are located between the cathode electrode plate 26 and the anode electrode plate 28.

The third layer positioned inwardly from the first end 14 is an outer electrodialysis EPDM gasket 30 positioned next to the cathode electrode plate 26, with another outer electrodialysis EPDM gasket 36 positioned next to the anode electrode plate 28 near the second end 18. The outer electrodialysis EPDM gaskets 30, 36 are about 0.062 inches thick (70 Duro), and have the following dimensions. The EPDM gaskets 30, 36 include an exterior width of about 1' 8", and an exterior length of about 3' 1", with about four spaced apart end holes of about 1" diameter through an area in the upper portion of each gasket 30, 36, with each end hole center being about 2 ¾" down from the upper edge of the gaskets 30, 36. The interiors 32, 38 of the respective gasket gaskets 30, 36 are open to allow for optional placement of a layer of an appropriately sized turbulence promoter 34, 40 against the gaskets 30, 36. Each interior 32, 38 includes inside dimensions of a width of about 1'5 ½", and a length of about 2'4 ¾". Each turbulence promoter 34, 40 is sized with a width of about 1'5 ⅜", and a length of about 2'4 ⅜". The turbulence promoters 34, 40, if utilized in the membrane cell stack 12, are composed of a polypropylene fabric of about 0.030 inches thick. The turbulence promoters 34, 40 can be combined with additional back-to-back stacked turbulence promoters 68, 70 (see FIG. 5) to create additional turbulence in liquids moving through and past the respective gasket gaskets 30, 36.

The fourth layer inwards from the first end 14 (without counting the plurality of turbulence promoters 34, 68, 40, 70 that may be added), includes an anion membrane 42. The anion membrane 42 is the first of approximately six layers of a series of layers that can be repeated as often as desired by the operators of the electrodialysis system 10 for improved efficiency and flow of liquids through the membrane cell stack 12. The anion membrane 42 is about 0.031 inches thick, and includes the dimensions of about 1'8" wide and about 3'1" long with four spaced apart end holes of about 1" diameter through an area in the upper portion of the anion membrane 42 with each end hole center being about 2¾" down from the upper edge of the anion membrane 42.

Additional membranes, EPDM gaskets, and plate layers of the series of layers can include a fifth layer (without counting the plurality of turbulence promoters 34, 68, 40, 70 that may be added), composed of an electrodialysis EPDM gasket 44 having an offset interior opening 46. The EPDM gasket 44 is about 0.031 inches thick (60 Duro), and the dimensions of an exterior width of about 1'8", and an interior opening width of about 1'5½". The interior opening 46 includes an upper interior corner opening offset from the upper exterior side of the first or right side of about 8¾", and is offset downwards of about 3" from the upper exterior side of gasket 44. A similar sized offset in the interior opening 46 is within the opposed lower interior corner and includes an offset from the exterior side of the second or left side of about 8¾", and is offset upwards about 3" from the lower exterior side of gasket 44 (see FIGS. 2–5).

A sixth layer (without counting the plurality of turbulence promoters 34, 68, 40, 70 that may be added) is composed of a turbulence promoter 48 having an offset shape having an appropriate size for insertion into the interior opening 46 of EPDM gasket 44. The outer dimensions of promoter 48 includes a width of about 1'5⅜", and a length of about 2'10⅜", with offset extensions sized appropriately to be insertable into the interior opening 46 of EPDM gasket 44.

A seventh layer (without counting the plurality of turbulence promoters 34, 68, 40, 70 that may be added) is composed of a cation membrane 50 having a generally rectangular size of a width of about 1'8", and a length of about 3'1". The cation membrane 50 includes four spaced apart end holes of about 1" diameter through an area in the upper portion of the cation membrane 50 with each end hole center being about 2¾" down from the upper edge of the cation membrane 50, and four spaced apart end holes of about 1" diameter through an area in the lower portion of the cation membrane 50 with each end hole center being about 2¾" up from the lower edge of the membrane 50.

An eighth layer (without counting the plurality of turbulence promoters 34, 68, 40, 70 that may be added) is composed of another electrodialysis EPDM gasket 52 having an offset interior opening 54. The EPDM gasket 52 includes generally the dimensions of EPDM gasket 44, with the interior offset dimensions of the upper and lower opposed corners of opening 54 being a mirror image of interior opening 46.

A ninth layer (without counting the plurality of turbulence promoters 34, 68, 40, 70 that may be added) is composed of another turbulence promoter 56 having an offset shape for insertion into the interior opening 54 of EPDM gasket 52.

The plurality of disparate layers, fourth through ninth layers, can be repeated after EPDM gasket 52 and/or turbulence promoter 56, as required to improve efficiency of removal of polar components. A repeat set of disparate layers, can include anion membrane 42, EPDM gasket 44 having opening 46, and turbulence promoter 48 being sized for insertion into opening 46. Cation membrane 50 is followed by EPDM gasket 52 having opening 54, and turbulence promoter 56 being sized for insertion into opening 54.

Following one or more sets of disparate layers 42–52, another anion membrane 58 is positioned, the anion membrane 58 having the dimensions of anion membrane 42 described above. The anion membrane 58 is followed by EPDM gasket 60 having opening 62 sized and shaped comparable to EPDM gasket 44 and opening 46. Turbulence promoter 64 is sized and shaped to fit closely against EPDM gasket 60, with a cation membrane 66 following in series. Cation membrane 66 is sized and shaped comparable to cation membrane 50.

Figure 5:
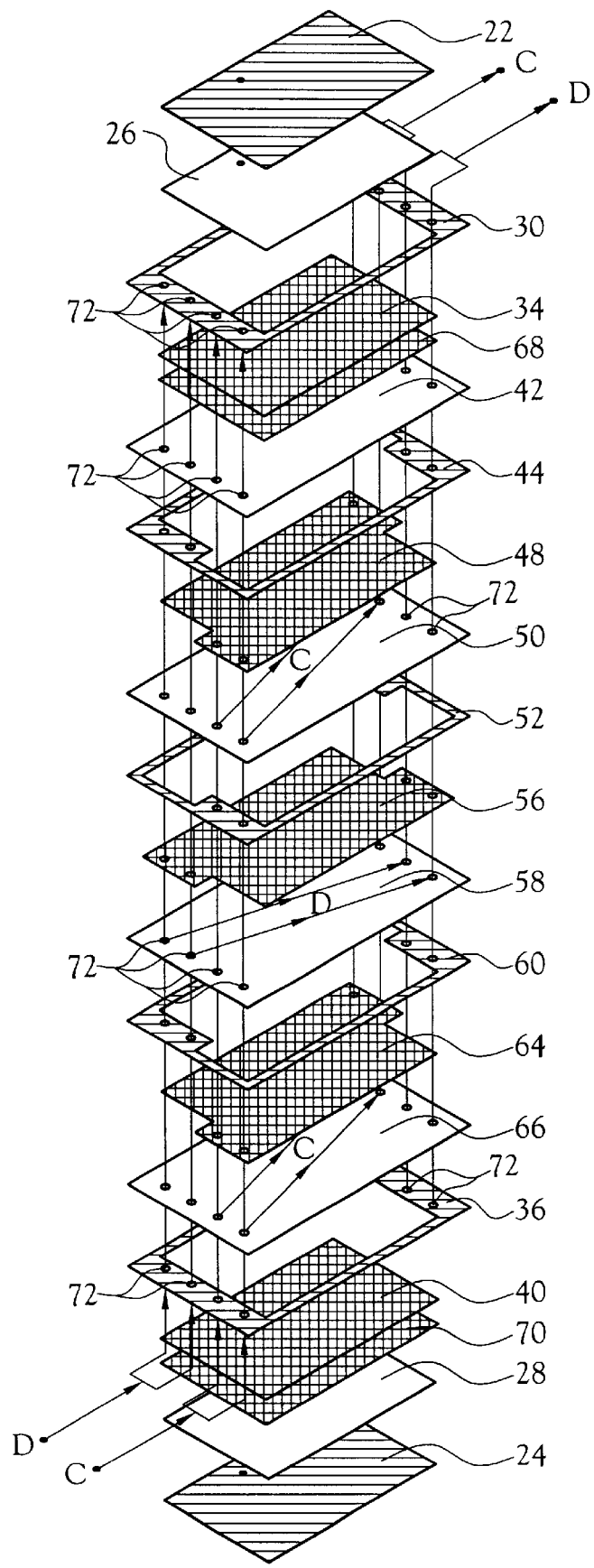
FIG. 5 is a perspective view of FIG. 3 of a plurality of disparate layers illustrating the flow of liquid mixtures through the stacked disparate layers.

The second end layers include the layers discussed above of second electrodialysis EPDM gasket 36, having opening 38 therethrough, followed by turbulence promoter 40, or additional stacked turbulence promoters, followed by the outer second end layers of anode electrode plate 28, and the second electrodialysis EPDM gasket 24. Concentrate C liquid streams and dilute D liquid streams are directed through the cell stack 12 by passage through a plurality of end holes 72 in each of the following layers: 30, 42, 44, 48, 50, 52, 56, 58, 60, 64, 66, and 36. Concentrate C liquid streams and dilute D liquid streams can be directed into the cell stack 12 at the first end 14, as shown in FIG. 1, for passage through the plurality of end holes 72, and exiting at the second end 18, or alternatively can be directed into the end proximate the anode plate 28, as shown in FIG. 5, for passage through the plurality of end holes 72, and exiting at the end proximate cathode plate 26.

A connecting means such as a support frame 20 known to those skilled in the art is connected by connection rods 16, 16' through the outer edges of the layers including EPDM gasket 30, the EPDM gasket 36, for containment of the membrane cell stack12 positioned within the support frame 20.

A method of operation is disclosed including a system for electrodialysis treatment of contaminated liquid mixtures including the operations of feeding a volume of contaminated liquids 108, into a pretreating system 112 for filtration of inorganic contaminants and organic contaminants with the pretreatment operation including a pretreatment settling tank 110. The pretreatment system 112 can incorporate an oil-water separator known to those skilled in the art, for generating a filtrate effluent 114 that is processed by an adsorbing operation 116, 118 for adsorbing organic contaminants from the filtrate effluent utilizing activated carbon adsorption 116, and/or polishing with carbon particles in a polishing step 118, with the adsorbing operation 116, 118 generating a liquid fraction 120 for transfer to electrodialysis deionizing operation 122.

A preferred embodiment for the method of the deionizing operation 122 is illustrated in FIGS. 1, and 4–9. The electrodialysis membrane cell stack 126 includes a plurality of disparate layers enclosed within a support frame 20 supported by end plates 132, 132'. The end plates 132, 132' can be composed of generally rigid PVC materials. Connector members such as a pair of connector bolts 16, 16' of about 7/8 inch threaded diameter and having lengths of about four inches long fasten the cell stack 126 together.

Multiple input streams are introduced through end plate 132, into input valves 124, 124', 124", 124"', with multiple output streams released from end plate 132', from output or exit valves 142, 142', 142", 142"' (see FIGS. 6–9). The liquid streams requiring deionizing are directed through the cell stack 126 by passage through a plurality of end holes 72 in each of the following respective layers: 30, 42, 44, 48, 50, 52, 56, 58, 60, 64, 66, and 36.

The cell stack 126 (see FIGS. 4–7) can accept multiple input streams such as dilute D input streams 128, 128', and concentrate C input streams 130, 130'. The concentrate C input streams 130, 130' are directed through the plurality of end holes 72 of the respective layers of cell stack 126, and the streams 130, 130' travel between cation membranes 50, 66 and anion membranes 42, 58 due to the influence of turbulence promoters 48 and 64, and EPDM gaskets 44, 52, 36 and 60, to follow a tortuous flow for exit as concentrate C exit streams 140, 140' from the cell stack 126 at exit valves 142, 142'.

The dilute D input streams 128, 128' are directed through the cell stack 126 through the plurality of end holes 72 forming an outer passage at each opposed end of a plurality of the layers of the cell stack to follow a tortuous flowpath at about the middle portions of the cell stack 126, due to the influence of turbulence promoter 56 and EPDM gaskets 52 and 60. The dilute D streams pass through the outer passage holes of stacked membranes and gaskets for exit of the dilute D exit streams 138, 138' from the cell stack 126 at exit valves 142" and 142"' (see FIGS. 4 and 5).

Electrode 134 is inserted through front end plate 132, and extends through EPDM gasket 22, for contact with, and maintenance of an electrical charge on cathode plate 26. Electrode 134' is inserted through rear end plate 132', and extends through EPDM gasket 24, for contact with, and maintenance of an electrical charge on anode plate 28. The electrodes are about 3/8 inch diameter threaded rods.

As shown in FIGS. 4, 6–9, an electrolyte E stream is injected in one side into at least one intake valve 136 of front end plate 132, for flow across the cathode plate 26 near the first end 14, and flow across the anode plate 28 near the second end 18, for exit from at least one exit valve 136' in the back end plate 132' of the cell stack 126 without mixing with the dilute D streams or the concentrate C streams. The electrolyte E stream can be composed of a salt solution that provides a conducting solution to each cathode plate 26 and anode plate 28 of the cell stack 126 for improved performance of each electrically charged plate 26, 28.

The electrodialysis deionizing operation 122 selectively removes contaminant ions from the liquid fraction during the continuous passage of the liquid fraction through the cell stack 126. The electrodialysis cell stack of the deionizing operation provides continuous purifying for ethylene glycol or for glycol/water mixtures, for continuous desalinating of water, and/or for continuous deionizing of water to generate ultra-pure water or other purified liquid mixtures.

The deionizing operation can be followed by an evaporation system 144 for removal of excess water from the purified ethylene glycol or other liquid mixtures, with the purified liquids and/or deionized liquids being available for combining with distilled water in a dilution process 146, for recycle and reuse of the purified and deionized liquid effluent 148.

The combination of treatment operations and the deionization operation provides a continuous operating system with minimized down-time and improved efficiencies over prior methods for purification and deionizing of liquid mixtures.

Analytical results demonstrate the efficiency of the deionizing operation utilizing the electrodialysis stack having a plurality of ion exchange membranes and separating gaskets as illustrated in FIGS. 2 and 3. The analytical results were obtained by testing of the electrodialysis membrane stack design utilizing four cells in parallel, versus a baseline design of cells without the improved electrodialysis membrane cell stack 126 design. The percent reduction in processing time is based on average overall deionizing time, and based on average conductivity change per time per unit of four cells. The results can be summarized that four cells with the improved membranes instead of four cells having prior art membrane stack designs, plus operating in parallel the improved electrodialysis membrane cell stack 12 design to provide about 42% to about 44% decrease in processing time for a 5,000 gallon batch of liquids compared to prior membrane stack designs. The average processing time for a 5,000 gallon batch of liquids is estimated to be about 20.5 hours per batch, reduced from an average of about 36.9 hours per batch for prior art membrane stack designs.

The benefits of the apparatus and system of operation disclosed is a reduction in overall processing times for the separation of polar components within liquid mixtures for purification and deionization of liquid mixtures, an ease of assembly for reduction in assembly times, and a simplified assembly with a lesser amount of parts.

One skilled in the art will recognize the associated mechanical components which support the system are illustrated in the Figures for clarity only and other embodiments could be utilized without interfering with the objects and advantages of the present invention.

While a preferred embodiment is shown and described, it will be understood that it is not intended to limit the disclosure, but rather it is intended to cover all modifications and alternative apparatus configurations and systems of operation falling within the spirit and the scope of the invention as defined in the appended claims.

What is claimed is:

1. A method for electrodialysis treatment of liquid mixtures including concentrate liquids and/or dilute liquids comprising the operations of:

providing a pretreating operation for filtration of inorganic contaminants and organic contaminants, said pretreatment operation generating a filtrate effluent;

providing an adsorbing operation for adsorbing organic contaminants from said filtrate effluent utilizing activated carbon adsorption, said adsorbing operation generating a liquid fraction; and providing a deionizing operation for continuous purifying of said liquid fraction from said adsorbing operation, said liquid fraction including a plurality of liquid input streams, said deionizing operation including utilizing an electrodialysis stack having a plurality of disparate layers including a plurality of ion exchange membranes and separating gaskets, said deionizing operation selectively removing contaminant ions from said plurality of liquid input streams of said liquid fraction continuously directed along a tortuous path between respective ion exchange membranes and separating gaskets of said plurality of disparate layers of said electrodialysis stack;

whereby said deionizing operation providing said electrodialysis stack having said plurality of disparate layers including ion exchange membranes providing continuous purifying of said liquid fraction including ethylene glycol and glycol/water mixtures, and providing continuous purifying of water, and/or continuous purifying of ethylene glycol and/or glycol and water mixtures.

2. The method for electrodialysis treatment of claim 1, wherein said deionizing operation comprises:

providing an electrodialysis cell stack including said plurality of disparate layers being stacked together, said electrodialysis cell stack having a first end and a second end, said plurality of disparate layers being disposed contiguous and having a first outer layer at said first end, and a second outer layer at said second end;

supporting said electrodialysis cell stack within a support frame having a first outer end proximate said first end of said cell stack, and having a second outer end proximate said second end, with said plurality of disparate layers interdisposed therebetween said first outer end and said second outer end;

providing at least two electrodialysis gaskets including a first electrodialysis gasket being positioned at said first outer end, and a second electrodialysis gasket being positioned at said second outer end;

positioning a cathode electrode plate proximate and interior of said first electrodialysis gasket being positioned at said first outer end;

positioning an anode electrode plate proximate and interior of said second electrodialysis gasket being positioned at said second outer layer;

providing at least two membrane gaskets having opposed end holes for flow of said liquid fraction therethrough, including a first membrane gasket being positioned proximate and interior of said cathode electrode plate, and a second membrane gasket being positioned proximate and interior of said anode electrode plate, said first membrane gasket and said second membrane gasket having a central opening therethrough;

positioning said plurality of disparate layers in series including:

an anion membrane having opposed end holes for flow of said liquid fraction therethrough;

at least one electrodialysis membrane gasket having opposed end holes for flow of said liquid fraction therethrough, said membrane gasket having a central opening therethrough;

at least one turbulence promoter layer being sized to fit proximate said opening within said at least one electrodialysis membrane gasket; and a cation membrane having opposed end holes for flow of said liquid fraction therethrough;

whereby said positioning said plurality of disparate layers being repeated in series;

passing the liquid fraction through said end holes of respective membranes of said plurality of disparate layers, said liquid fraction passing across at least one of said anion membrane and said cation membrane for transport of said liquid fraction through said electrodialysis cell stack; and supplying a voltage differential between said cathode electrode plate and said anode electrode plate for improved removal of polar contaminants from said liquid fraction passing across said at least one anion membrane and said cation membrane located between said cathode electrode plate and said anode electrode plate;

whereby said deionizing operation purifies and deionizes the liquid fraction being passed therethrough.

3. A method for electrodialysis treatment of liquid mixtures including concentrate liquids and/or dilute liquids comprising the operations of:

providing a pretreating operation for filtration of inorganic contaminants and organic contaminants from the liquid mixtures, said pretreatment operation generating a filtrate effluent;

providing an adsorbing operation for adsorbing organic contaminants from said filtrate effluent utilizing activated carbon adsorption, said adsorbing operation generating a liquid fraction; and providing a deionizing operation for continuous purifying of said liquid fraction from said adsorbing operation, including utilizing an electrodialysis stack having a plurality of disparate layers including a plurality of ion exchange membranes having porous ends and separating gaskets having porous ends, said deionizing operation selectively removing contaminant ions from said liquid fraction continuously directed to flow in a tortuous path between respective porous ends of said ion exchange membranes and separating gaskets of said plurality of disparate layers;

whereby said deionizing operation providing said electrodialysis stack having said plurality of ion exchange membranes providing continuous purifying and deionizing of said liquid fraction.

4. The method for electrodialysis treatment of claim 3, wherein said deionizing operation further comprising the operations of:

providing an electrodialysis cell stack including a plurality of disparate layers being stacked together, said electrodialysis cell stack having a first end and a second end, said plurality of disparate layers being disposed contiguous and having a first outer layer at said first end, and a second outer layer at said second end;

supporting said electrodialysis cell stack within a support frame having a first outer end proximate said first end of said cell stack, and having a second outer end proximate said second end, with said plurality of disparate layers interdisposed therebetween said first outer end and said second outer end;

providing at least two electrodialysis gaskets including a first electrodialysis gasket being positioned at said first outer end, and a second electrodialysis gasket being positioned at said second outer end;

positioning a cathode electrode plate proximate and interior of said first electrodialysis gasket being positioned at said first outer end;

positioning an anode electrode plate proximate and interior of said second electrodialysis gasket being positioned at said second outer layer;

providing at least two membrane gaskets including a first membrane gasket being positioned proximate and interior of said cathode electrode plate, and a second membrane gasket being positioned proximate and interior of said anode electrode plate, said first membrane gasket and said second membrane gasket having an opening therethrough;

positioning said plurality of disparate layers in series including:

an anion membrane having a plurality of spaced apart end holes for flow of said liquid fraction therethrough;

at least one electrodialysis membrane gasket having an opening therethrough, said membrane gasket having a plurality of spaced apart end holes for flow of said liquid fraction therethrough;

at least one turbulence promoter layer being sized to fit proximate said opening within said at least one electrodialysis membrane gasket; and a cation membrane having a plurality of spaced apart end holes for flow of said liquid fraction therethrough;

whereby said positioning said plurality of disparate layers being repeated in series;

passing said liquid fraction through said plurality of spaced apart end holes through respective anion and cation membranes and membrane gaskets of said electrodialysis cell stack, said liquid fraction passing across at least one of said anion membrane and said cation membrane; and supplying a voltage differential between said cathode electrode plate and said anode electrode plate;

whereby said deionizing operation purifies and deionizes said liquid fraction being passed therethrough.

5. The method for electrodialysis treatment of claim 4, wherein said deionizing operation for continuous purifying of said liquid fraction further including the operations of:

providing continuous purifying of liquid mixtures of ethylene glycol, glycol/water mixtures, and/or ethylene glycol and water;

providing an evaporation system for removal of water from the purified ethylene glycol, glycol/water mixtures, and/or ethylene glycol and water; and providing continuous deionizing and desalinating of water.

6. A method for electrodialysis treatment of liquid mixtures including concentrate liquids and/or dilute liquids comprising the operations of:

providing a pretreating operation for filtration of inorganic contaminants and organic contaminants from the liquid mixtures, said pretreatment operation generating a filtrate effluent;

providing an adsorbing operation for adsorbing organic contaminants from said filtrate effluent utilizing activated carbon adsorption, said adsorbing operation generating a liquid fraction; and providing a deionizing operation for continuous purifying of said liquid fraction from said adsorbing operation, said deionizing operation including utilizing an electrodialysis stack having a plurality of disparate layers including ion exchange membranes and separating gaskets, said deionizing operation selectively removing contaminant ions from said liquid fraction continuously directed along a plurality of tortuous paths between respective ion exchange membranes and separating gaskets of said plurality of disparate layers of said electrodialysis stack;

introducing multiple input streams of said liquid fraction into a first end of said electrodialysis stack; and releasing multiple output streams of a purified and deionized liquid fraction from a second end of said electrodialysis stack;

whereby said deionizing operation providing said electrodialysis stack having said plurality of disparate layers including ion exchange membranes providing continuous purifying and deionizing of said multiple input streams of said liquid fraction by continuously directing said multiple input streams along a plurality of reversing tortuous paths between respective ion exchange membranes and separating gaskets within said electrodialysis stack.

7. The method for electrodialysis treatment of claim 6, wherein said deionizing operation further comprising the operations of:

providing an electrodialysis cell stack including a plurality of disparate layers being stacked together, said electrodialysis cell stack having a first end and a second end, said plurality of disparate layers being disposed contiguous and having a first outer layer at said first end, and a second outer layer at said second end;

supporting said electrodialysis cell stack within a support frame having a first outer end proximate said first end of said cell stack, and having a second outer end proximate said second end, with said plurality of disparate layers interdisposed therebetween said first outer end and said second outer end;

providing at least two electrodialysis gaskets including a first electrodialysis gasket being positioned at said first outer end, and a second electrodialysis gasket being positioned at said second outer end;

positioning a cathode electrode plate proximate and interior of said first electrodialysis gasket being positioned at said first outer end;

positioning an anode electrode plate proximate and interior of said second electrodialysis gasket being positioned at said second outer layer;

providing at least two membrane gaskets having opposed end holes for flow of said multiple input streams of said liquid fraction therethrough, including a first membrane gasket being positioned proximate and interior of said cathode electrode plate, and a second membrane gasket being positioned proximate and interior of said anode electrode plate, said first membrane gasket and said second membrane gasket having an opening therethrough, positioning said plurality of disparate layers in series including:

an anion membrane having opposed end holes for flow of said multiple input streams of said liquid fraction therethrough;

at least one electrodialysis membrane gasket having opposed end holes for flow of said multiple input streams of said liquid fraction therethrough, said membrane gasket having a central opening therethrough, at least one turbulence promoter layer being sized to fit proximate said central opening within said at least one electrodialysis membrane gasket; and a cation membrane having opposed end holes for flow of said multiple input streams of said liquid fraction therethrough;

whereby said positioning said plurality of disparate layers being repeated in series;

passing said multiple input streams of said liquid fraction through respective end holes of said respective anion membranes and cation membranes, said multiple input streams continuously directed along said reversing tortuous paths between respective anion membranes and cation membranes and separating membrane gaskets of said plurality of disparate layers of said electrodialysis cell stack; and supplying a voltage differential between said cathode electrode plate and said anode electrode plate;

whereby said deionizing operation purifies and deionizes said multiple input streams of said liquid fraction being passed therethrough.

8. The method for electrodialysis treatment of claim 6, wherein said deionizing operation for continuous purifying of said liquid fraction having multiple input streams further including the operations of:

providing continuous purifying of liquid mixtures of ethylene glycol, or ethylene glycol and water within said electrodialysis stack; and providing continuous deionizing and desalinating of water within said electrodialysis stack.

* * * * *